US010879816B2

(12) United States Patent
Irie

(10) Patent No.: US 10,879,816 B2
(45) Date of Patent: Dec. 29, 2020

(54) INVERTER CONTROL DEVICE

(71) Applicant: DENSO CORPORATION, Kariya (JP)

(72) Inventor: Koji Irie, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/999,612

(22) PCT Filed: Feb. 13, 2017

(86) PCT No.: PCT/JP2017/005148
§ 371 (c)(1),
(2) Date: Aug. 20, 2018

(87) PCT Pub. No.: WO2017/141872
PCT Pub. Date: Aug. 24, 2017

(65) Prior Publication Data
US 2019/0238063 A1 Aug. 1, 2019

(30) Foreign Application Priority Data
Feb. 18, 2016 (JP) .................................. 2016-029203

(51) Int. Cl.
H02M 7/5387 (2007.01)
H02P 27/08 (2006.01)
(Continued)

(52) U.S. Cl.
CPC ......... *H02M 7/53871* (2013.01); *H02M 1/12* (2013.01); *H02M 7/539* (2013.01); *H02P 21/22* (2016.02); *H02P 27/08* (2013.01)

(58) Field of Classification Search
CPC ........ H02P 27/06; H02P 23/30; H02P 25/098; H02M 1/32; H02M 5/4505
See application file for complete search history.

(56) References Cited

U.S. PATENT DOCUMENTS

| 5,491,393 A * | 2/1996 | Uesugi | H02K 1/276 |
| | | | 318/400.28 |
| 6,397,611 B1 * | 6/2002 | Yamato | F24F 11/83 |
| | | | 62/180 |

(Continued)

FOREIGN PATENT DOCUMENTS

JP 2014-143831 A 8/2014

OTHER PUBLICATIONS

Mar. 21, 2017 International Search Report issued in International Patent Application No. PCT/JP2017/005148.
(Continued)

*Primary Examiner* — Zoheb S Imtiaz
(74) *Attorney, Agent, or Firm* — Oliff PLC

(57) ABSTRACT

A control device alternately turns on an upper arm switch and a lower arm switch constituting an inverter on the basis of an operation pattern that is a time-series pattern that defines a switching pattern for each of the upper arm switch and the lower arm switch. The control device detects each of a present pattern that is the operation pattern currently set and a next pattern that is the operation pattern to be set next time. A plurality of timings is set in the middle of the present pattern over one electrical angle period as candidates of switching from the present pattern to the next pattern, and the control device selects a command switching timing from among the plurality of timings. The control device switches the operation pattern from the present pattern to the next pattern at the selected command switching timing.

9 Claims, 11 Drawing Sheets

(51) Int. Cl.
*H02M 7/539* (2006.01)
*H02M 1/12* (2006.01)
*H02P 21/22* (2016.01)

(56) References Cited

U.S. PATENT DOCUMENTS

| | | | | |
|---|---|---|---|---|
| 2002/0140395 A1* | 10/2002 | Tazawa | ............... | H02P 6/182 |
| | | | | 318/727 |
| 2002/0180402 A1* | 12/2002 | Koide | ............... | H02P 23/30 |
| | | | | 318/727 |
| 2010/0134053 A1 | 6/2010 | Yamada et al. | | |
| 2011/0080125 A1 | 4/2011 | Shimada et al. | | |
| 2017/0126155 A1* | 5/2017 | Kurosawa | ............... | H02P 27/08 |

OTHER PUBLICATIONS

May 9, 2017 International Search Report issued in International Patent Application No. PCT/JP2017/005149.
U.S. Appl. No. 16/079,700, filed Aug. 24, 2018 in the name of Koji Irie.
May 9, 2017 Written Opinion issued in International Patent Application No. PCT/JP2017/005149.
Mar. 21, 2017 Written Opinion issued in International Patent Application No. PCT/JP2017/005148.

\* cited by examiner

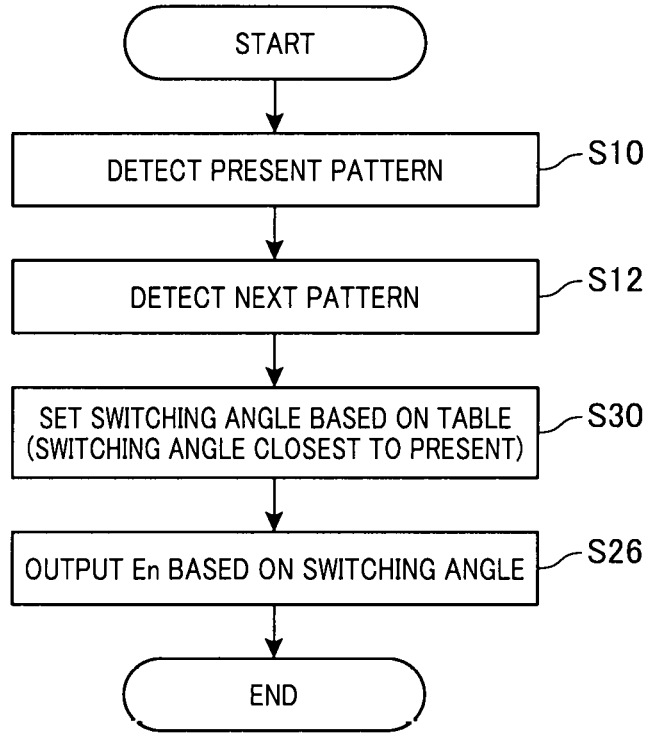

INVERTER CONTROL DEVICE

CROSS-REFERENCE TO RELATED APPLICATION

The present application is based on Japanese Patent Application No. 2016-029203 filed on Feb. 18, 2016, the entire contents of which are incorporated herein by reference.

TECHNICAL FIELD

The present disclosure relates to a control device that is applied to an inverter including series connections of upper arm switches and lower arm switches.

BACKGROUND ART

Patent Literature 1 (PTL 1) below is a known example of this type of control device. Specifically, upper and lower arm switches are alternately turned on based on a switching pattern defined over one electrical angle period in order to output a sine-wave current from an inverter. The switching pattern satisfies the conditions that the number of pulses per half period is a designated number of pulses and that low-order harmonics of the output voltage from the inverter are reduced. If there is a change in the designated number of pulses, the control device switches the switching pattern after a switching transitional period for limiting fluctuations in the line voltage output from the inverter.

CITATION LIST

Patent Literature

[PTL 1] JP 2014-143831 A

SUMMARY OF THE INVENTION

If a switching pattern defined over one electrical angle period is changed to another switching pattern in the middle of one electrical angle period, an offset can occur in the output current from the inverter, or extremely low period fluctuation components can be superimposed on the output current from the inverter. Generally, the lower the current frequency components superimposed on the output current are, the larger the fluctuations in the output power from the inverter are. Therefore, it is necessary to prevent an offset in the output current from the inverter or superimposition of extremely low period fluctuation components on the output current from the inverter due to a change in switching pattern.

A main object of the present disclosure is to provide an inverter control device capable of limiting fluctuations in the output power from an inverter.

Hereinafter, means of solving the above-mentioned problems and the effects thereof will be described.

According to the present disclosure, an inverter control device is applied to an inverter including series connections each of an upper arm switch and a lower arm switch, the inverter control device is configured to alternately turn on the upper arm switch and the lower arm switch on the basis of an operation pattern that is a time-series pattern that defines a switching pattern for each of the upper arm switch and the lower arm switch, and the inverter control device includes: a detection unit that detects each of a present pattern that is the operation pattern currently set and a next pattern that is the operation pattern to be set next time; a timing selecting unit that selects a command switching timing from among a plurality of timings set in the middle of the present pattern over one electrical angle period, the plurality of timings being candidates of switching from the present pattern to the next pattern; and a switching unit that switches the operation pattern from the present pattern to the next pattern at the command switching timing selected by the timing selecting unit.

The offset amount in the output current from the inverter varies according to the timing of switching from the present pattern to the next pattern in one electrical angle period. Therefore, fluctuations in the output power from the inverter can be limited by switching the operation pattern from the present pattern to the next pattern at an appropriate timing.

In view of the above, according to the above disclosure, a plurality of timings is set in the middle of the present pattern over one electrical angle period as candidates for the timing of switching from the present pattern to the next pattern, and a switching timing is selected from among the plurality of timings. Consequently, the operation pattern can be switched from the present pattern to the next pattern at an appropriate timing for reducing the output current offset amount. Thus, fluctuations in the output power from the inverter can be limited.

BRIEF DESCRIPTION OF DRAWINGS

The above and other objects, characteristics, and advantages of the present disclosure will be further clarified in the following detailed description with reference to the accompanying drawings, in which:

FIG. 11 is a flowchart illustrating a procedure for a switching angle selection process according to a second embodiment;

FIG. 12 is a diagram illustrating how candidates for a switching angle corresponding to present and next patterns are stored;

FIG. 13 is a diagram illustrating how candidates for a switching angle corresponding to present and next patterns are stored;

DESCRIPTION OF EMBODIMENTS

First Embodiment

Hereinafter, the first embodiment for putting a control device according to the present disclosure into practice will be described with reference to the drawings. The control device according to the present embodiment is applied to a three-phase inverter connected to a three-phase rotating electrical machine. The control device and the rotating electrical machine are mounted in a vehicle such as an electric car and a hybrid car.

Figure 1:
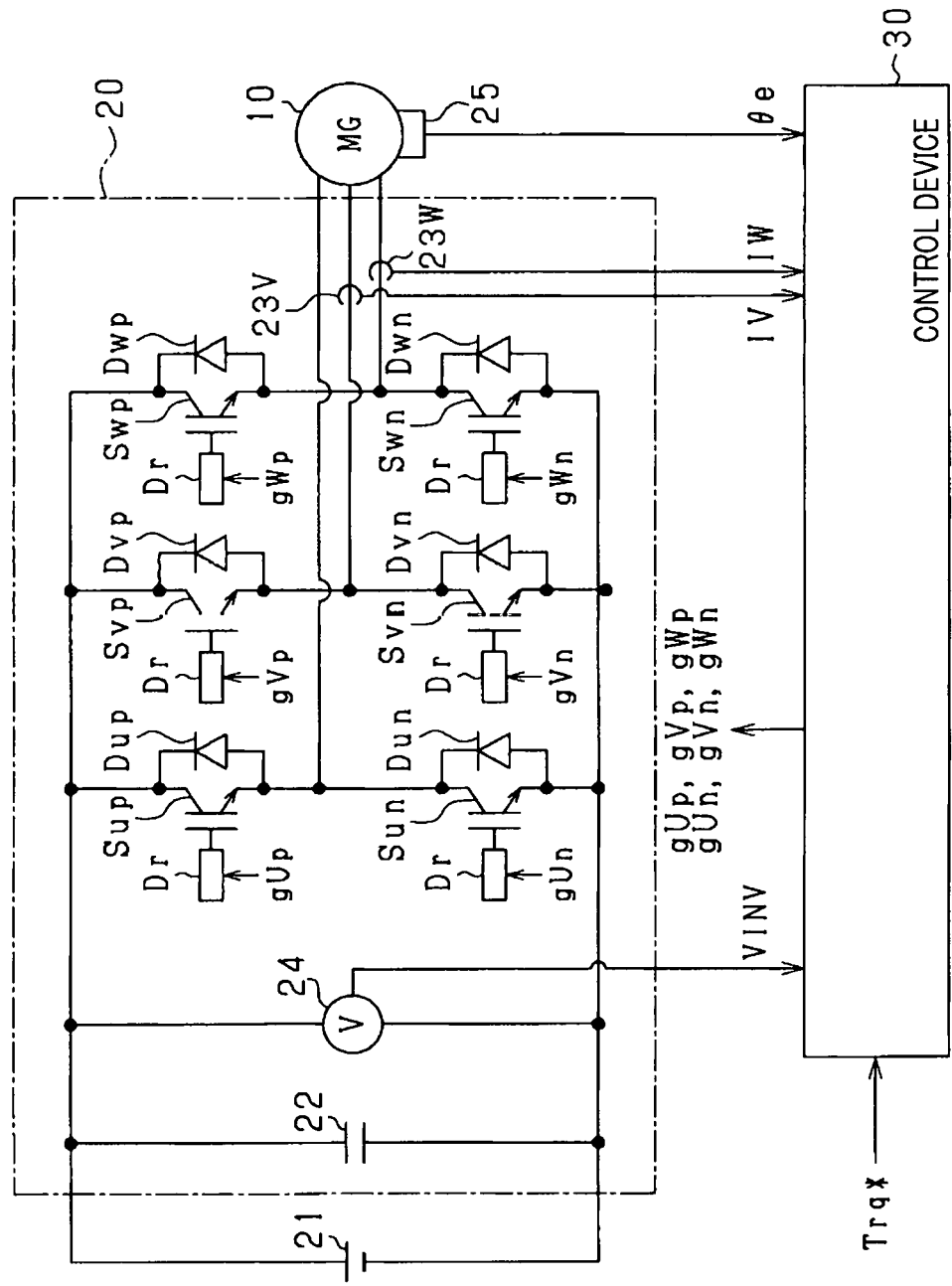
FIG. 1 is an overall configuration diagram of a motor control system according to a first embodiment.

As illustrated in FIG. 1, a motor control system includes a motor generator 10, a three-phase inverter 20, and a control device 30. In the present embodiment, the motor generator 10 is an in-vehicle main engine, and the rotor thereof is mechanically connected to driving wheels (not illustrated). In the present embodiment, a synchronous machine is used as the motor generator 10. In particular, a permanent magnet embedded synchronous machine is used as the motor generator 10.

The motor generator 10 is connected to a battery 21 that serves as a DC power source via the inverter 20. The output voltage from the battery 21 is, for example, 100 V or more. Note that a smoothing capacitor 22 that smooths the input voltage to the inverter 20 is provided between the battery 21 and the inverter 20.

It is to be noted that in a case where a boost converter that increases the output voltage from the battery 21 for output to the inverter 20 is provided in a control system, the boost converter corresponds to a DC power source.

The inverter 20 includes series connections of upper arm switches Sup, Svp, and Swp and lower arm switches Sun, Svn, and Swn. The number of series connections is equal to the number of phases. Each series connection is connected in parallel with the battery 21. The connection point between the U-phase upper arm switch Sup and the U-phase lower arm switch Sun is connected to the U phase of the motor generator 10. The connection point between the V-phase upper arm switch Svp and the V-phase lower arm switch Svn is connected to the V phase of the motor generator 10. The connection point between the W-phase upper arm switch Swp and the W-phase lower arm switch Swn is connected to the W phase of the motor generator 10. In the present embodiment, voltage-controlled semiconductor switching elements are used as the switches Sup, Sun, Svp, Svn, Swp, and Swn. In particular, IGBTs are used. Freewheeling diodes Dup, Dun, Dvp, Dvn, Dwp, and Dwn are connected in inverse parallel with the switches Sup, Sun, Svp, Svn, Swp, and Swn, respectively.

The motor control system further includes a phase current detector that detects at least two of the phase currents that flow into the motor generator 10. In the present embodiment, the phase current detector includes a V-phase current detector 23V that detects the current that flows into the V phase of the motor generator 10 and a W-phase current detector 23W that detects the current that flows into the W phase of the motor generator 10. The motor control system also includes a voltage detector 24 and an angle detector 25. The voltage detector 24 detects the output voltage from the battery 21 as a power supply voltage VINV to the inverter 20. The angle detector 25 detects an electrical angle $\theta e$ of the motor generator 10. Note that a resolver can be used as the angle detector 25, for example.

The control device 30 mainly includes a microcomputer, and operates the inverter 20 so as to feed the amount of control of the motor generator 10 back to a command value therefor. In the present embodiment, the amount of control is torque, and the command value therefor is command torque Trq*. In order to turn on or off the switches Sup, Sun, Svp, Svn, Swp, and Swn constituting the inverter 20, the control device 30 respectively generates operation signals gUp, gUn, gVp, gVn, gWp, and gWn on the basis of values detected by the respective detectors, and outputs the generated operation signals gUp, gUn, gVp, gVn, gWp, and gWn to drive circuits Dr corresponding to the respective switches. The operation signals gUp, gVp, and gWp for the upper arms and the operation signals gUn, gVn, and gWn for the corresponding lower arms are complementary to each other. Specifically, an upper arm switch and the corresponding lower arm switch are alternately turned on. Note that the command torque Trq* is output, for example, from a higher-level control device provided outside the control device 30.

Figure 2:
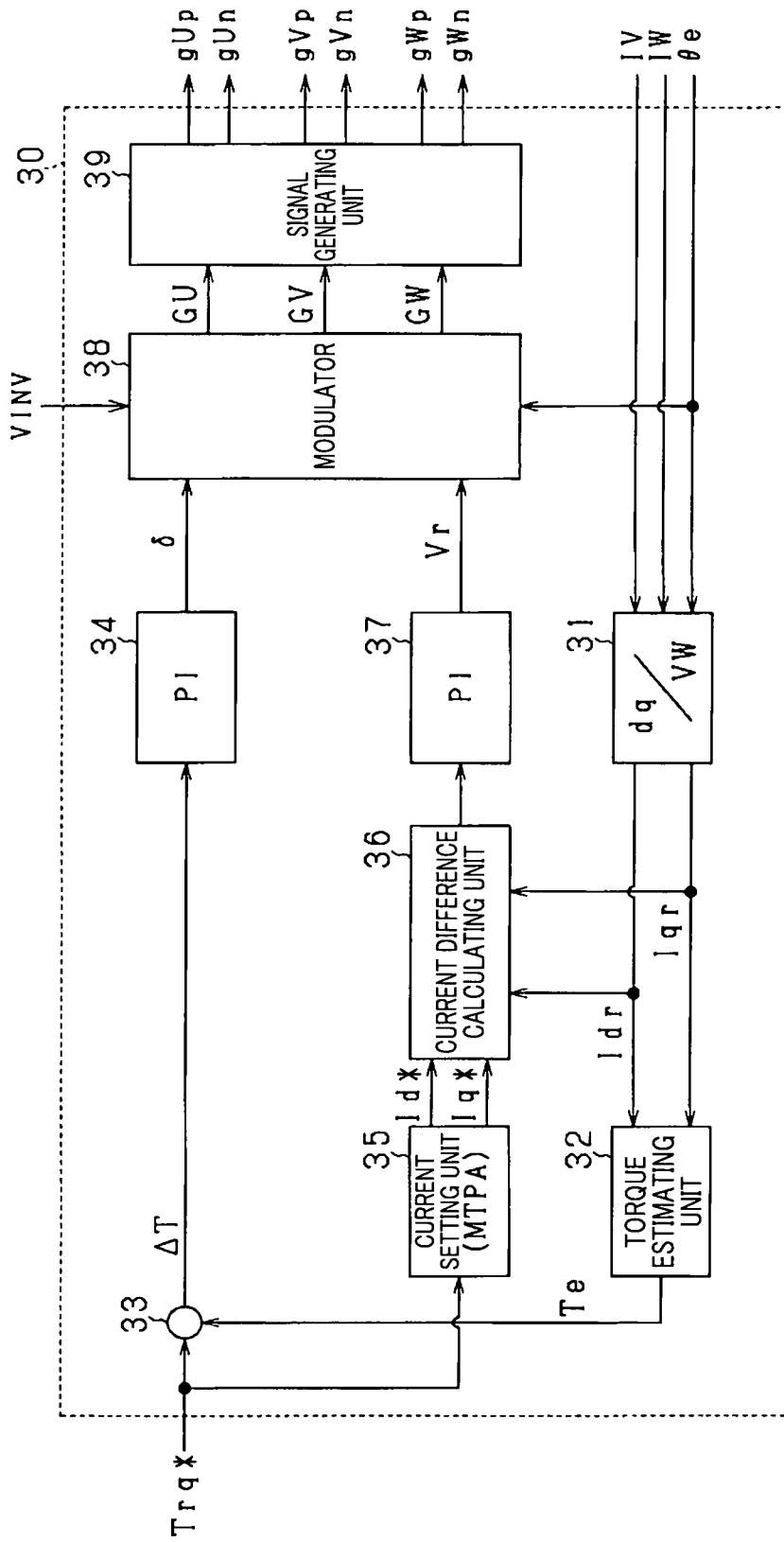
FIG. 2 is a block diagram illustrating a motor control process.

Next, the process of generating the operation signals performed by the control device 30 will be described using FIG. 2.

On the basis of a V-phase current IV detected by the V-phase current detector 23V, a W-phase current IW detected by the W-phase current detector 23W, and the electrical angle $\theta e$ detected by the angle detector 25, a two-phase converting unit 31 converts a U-phase current IU, the V-phase current IV, and the W-phase current IW in the three-phase fixed coordinate system of the motor generator 10 into a d-axis current Idr and a q-axis current Iqr in the dq coordinate system that is a two-phase rotating coordinate system.

A torque estimating unit 32 calculates an estimated torque Te of the motor generator 10 on the basis of the d-axis current Idr and the q-axis current Iqr output from the two-phase converting unit 31. The estimated torque Te may be calculated using a map indicating d-axis currents Idr and q-axis currents Iqr associated with estimated torques Te, or may be calculated using a model formula.

A torque difference calculating unit 33 calculates a torque difference $\Delta T$ by subtracting the estimated torque Te from the command torque Trq*.

On the basis of the torque difference $\Delta T$ calculated by the torque difference calculating unit 33, a phase calculating unit 34 calculates a command voltage phase $\delta$ as the amount of operation for feeding the estimated torque Te back to the command torque Trq*. The command voltage phase $\delta$ is a command value for the voltage phase of the output voltage vector of the inverter 20. In the present embodiment, the command voltage phase $\delta$ is calculated through proportional-integral control that uses the torque difference $\Delta T$ as input.

Note that the output voltage vector is defined by a d-axis voltage Vd that is a d-axis component of the output voltage vector in the dq coordinate system and a q-axis voltage Vq that is a q-axis component of the output voltage vector in the dq coordinate system. In the present embodiment, assuming that the positive direction of the d-axis is a reference, the positive direction of the voltage phase is defined as the counterclockwise direction from the reference.

On the basis of the command torque Trq*, a current setting unit 35 calculates a d-axis command current Id* and a q-axis command current Iq* for realizing the command torque Trq*. In the present embodiment, currents for realizing maximum torque per ampere control are calculated as the d-axis command current Id* and the q-axis command current Iq*.

A current difference calculating unit 36 calculates a d-axis current difference ΔId by subtracting the d-axis current Idr from the d-axis command current Id*. The current difference calculating unit 36 also calculates a q-axis current difference ΔIq by subtracting the q-axis current Iqr from the q-axis command current Iq*.

On the basis of the d-axis current difference ΔId and the q-axis current difference ΔIq, a voltage setting unit 37 calculates a command voltage amplitude Vr that is a command value for the voltage amplitude of the output voltage vector. Here, the voltage amplitude is defined as the square root of the sum of the square of the d-axis voltage Vd and the square of the q-axis voltage Vq. The voltage setting unit 37 first calculates a d-axis command voltage Vd* as the amount of operation for feeding the d-axis current Idr back to the d-axis command current Id* on the basis of the d-axis current difference ΔId, and calculates a q-axis command voltage Vq* as the amount of operation for feeding the q-axis current Iqr back to the q-axis command current Iq* on the basis of the q-axis current difference ΔIq. In the present embodiment, proportional-integral control is used as the feedback control. The voltage setting unit 37 then calculates the command voltage amplitude Vr on the basis of the d-axis command voltage Vd* and the q-axis command voltage Vq*.

On the basis of the command voltage phase δ, the command voltage amplitude Vr, the power supply voltage VINV detected by the voltage detector 24, and the electrical angle θe, a modulator 38 generates PWM signals GU, GV, and GW from which the operation signals gUp, gUn, gVp, gVn, gWp, and gWn are generated. The modulator 38 will be described in detail later.

A signal generating unit 39 generates the operation signals gUp, gUn, gVp, gVn, gWp, and gWn by performing the process of separating the logical inversion timings for the PWM signals GU, GV, and GW and the logical inversion signals thereof from one another by the dead time.

Figure 3:
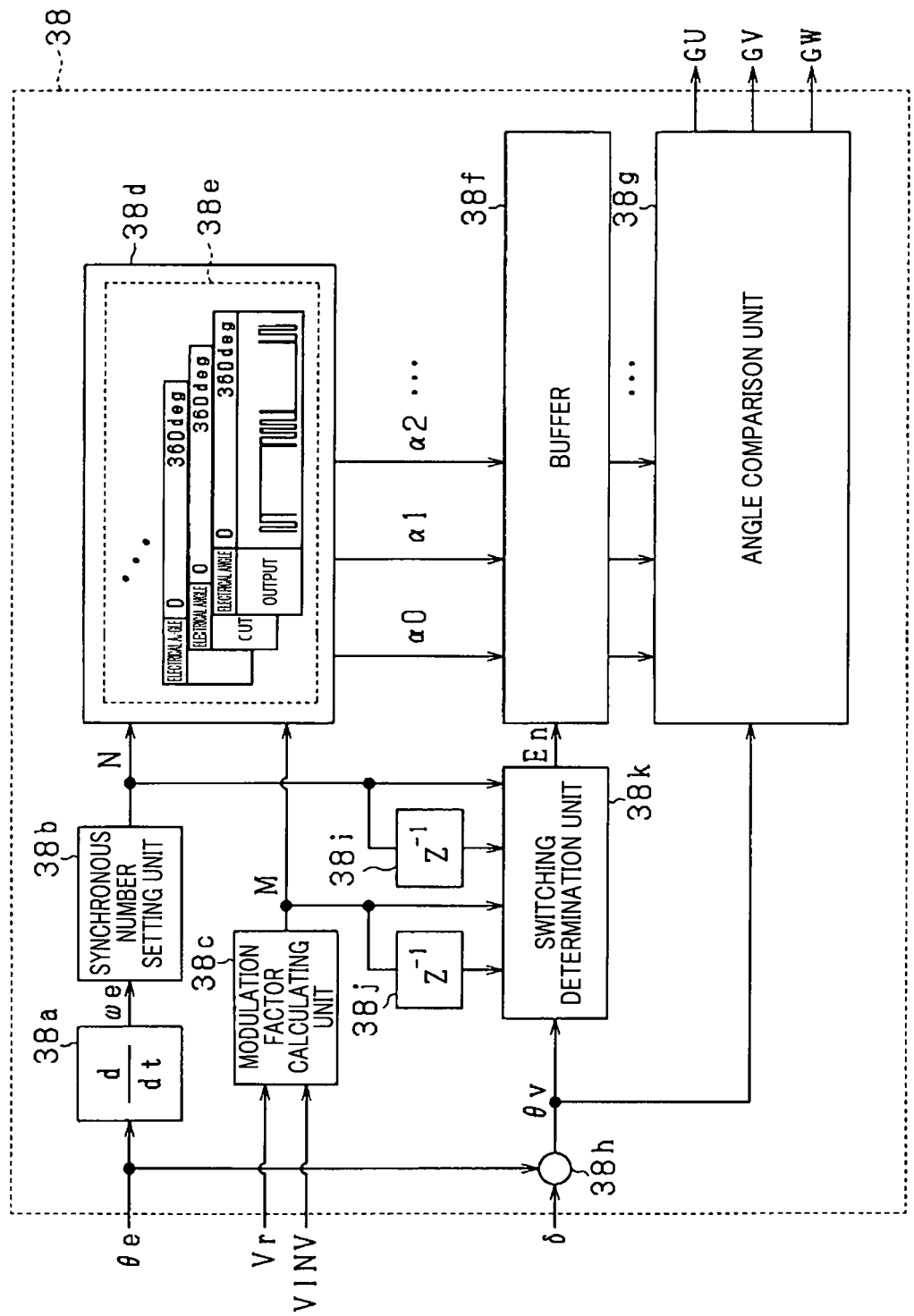
FIG. 3 is a block diagram illustrating a process of a modulator.

Next, the modulator 38 will be described using FIG. 3. In the present embodiment, the modulator 38 generates the PWM signals GU, GV, and GW by pulse pattern control.

A speed calculating unit 38a calculates an electric angular velocity ωe of the motor generator 10 on the basis of the electrical angle θe.

A synchronous number setting unit 38b calculates a synchronous number N on the basis of the electric angular velocity ωe and a synchronous number table. The reason why this calculation process is performed is that a pulse pattern is generated using the idea of synchronous triangular wave comparison PWM control that makes the integral multiple of one period of a carrier equal to one electrical angle period. The synchronous number table is information indicating a plurality of electric angular velocity regions and synchronous numbers N associated with each other in advance. In the present embodiment, examples of synchronous numbers N associated with the respective electric angular velocity regions include multiples of three: "3, 6, 9, 12, 15, etc." The upper limit threshold values ω3, ω6, ω9, ω12, ω15, etc. of the electric angular velocity regions associated with the respective synchronous numbers 3, 6, 9, 12, 15, etc. are set with ω(N)=2π×fcmax/N. Note that fcmax indicates the upper limit frequency of a carrier signal.

A modulation factor calculating unit 38c calculates a modulation factor M on the basis of the command voltage amplitude Vr and the power supply voltage VINV. Here, the modulation factor M is obtained by normalizing the command voltage amplitude Vr with the power supply voltage VINV. In the present embodiment, the modulation factor M is calculated using the following equation (eq1).

[Formula 1]

$$M = \frac{1}{\sqrt{1.5}} \frac{Vr}{\frac{VINV}{2}} \times 100 \quad \text{(eq 1)}$$

On the basis of the synchronous number N output from the synchronous number setting unit 38b and the modulation factor M, a pulse pattern selecting unit 38d selects a pulse pattern that is a switching pattern over one electrical angle period. In the present embodiment, a pulse pattern corresponds to an operation pattern. Pulse patterns are stored in advance in a pattern storage unit 38e in association with synchronous numbers N and modulation factors M.

Figure 4:
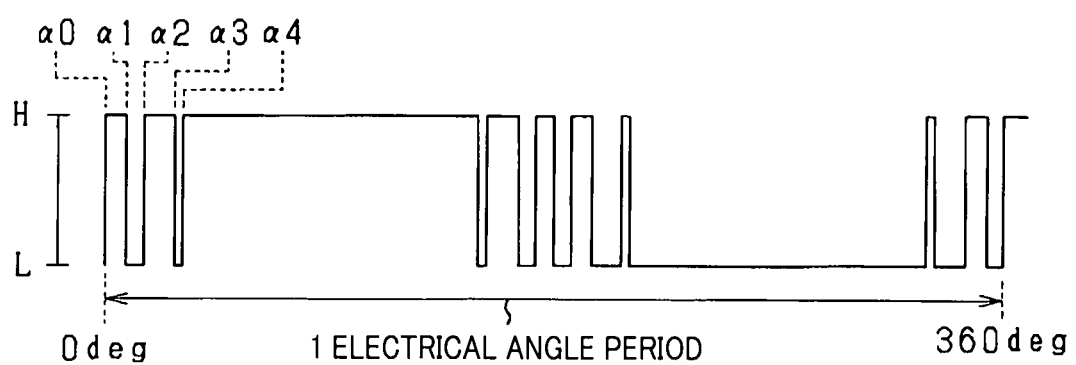
FIG. 4 is a diagram schematically illustrating a pulse pattern.

As illustrated in FIG. 4, a pulse pattern is information indicating, in association with electrical angles θe, each of an on-command signal indicating that an upper arm switch is to be turned on and a lower arm switch is to be turned off and an off-command signal indicating that an upper arm switch is to be turned off and a lower arm switch is to be turned on. In the present embodiment, signals having different logical values are used as the on and off-command signals. More specifically, a logical H signal is used as the on-command signal, and a logical L signal is used as the off-command signal. In the present embodiment, a pulse pattern is symmetrical about the center (180°) of one electrical angle period from 0° to 360° in each of the U to W phases. Specifically, logical values at a pair of timings at equal electric angular distances from the center are opposite.

In the present embodiment, the pattern storage unit 38e stores, as pulse patterns, electrical angles at which the switch from one of the on-command signal and the off-command signal to the other is commanded. In the example of FIG. 4, α0, α1, α2, α3, and α4 are presented as switching phases that are electrical angles at which the switch from one of the on-command signal and the off-command signal to the other is commanded. It is to be noted that pulse patterns may be associated with command voltage amplitudes Vr instead of modulation factors M.

The pulse pattern selecting unit 38d selects one appropriate pulse pattern on the basis of the synchronous number N and the modulation factor M. The pulse pattern selecting unit 38d outputs the switching phases α of the selected pulse pattern to a buffer 38f.

In the present embodiment, the buffer 38f stores not only the switching phases of a present pattern that is a currently output pulse pattern but also the switching phases of a next pattern that is a pulse pattern scheduled to be output next time. The switching phases α output from the buffer 38f are input to an angle comparison unit 38g. The angle comparison unit 38g selects, from among the input switching phases α, a switching phase corresponding to an addition value θv calculated by adding the electrical angle θe and the command voltage phase δ by an addition unit 38h. The angle comparison unit 38g generates and outputs the PWM signals GU, GV, and GW on the basis of the selected switching phase α.

A first data holding unit 38i holds the synchronous number N set by the synchronous number setting unit 38b during the previous control period. A second data holding unit 38j holds the modulation factor M set by the modulation factor calculating unit 38c during the previous control period.

A switching determination unit 38k performs a switching angle selection process. Specifically, the switching determination unit 38k selects a switching angle (corresponding to a command switching timing) indicating at which electrical angle in the middle of one electrical angle period the pulse pattern is switched from the present pattern to the next pattern. The switching determination unit 38k then outputs information on the selected switching angle to the buffer 38f as a switching permission signal En. The reason why this process is performed will be described below, and the details of the process will be described thereafter.

First, the reason why the switching angle selection process is performed will be described using FIGS. 5 and 6.

Depending on the timing of switching from the present pattern to the next pattern, a current offset that is the electrical angle zero-order component of each phase current can occur, resulting in torque fluctuations in the motor generator 10. The switching angle selection process is performed in order to limit torque fluctuations.

Figure 5:
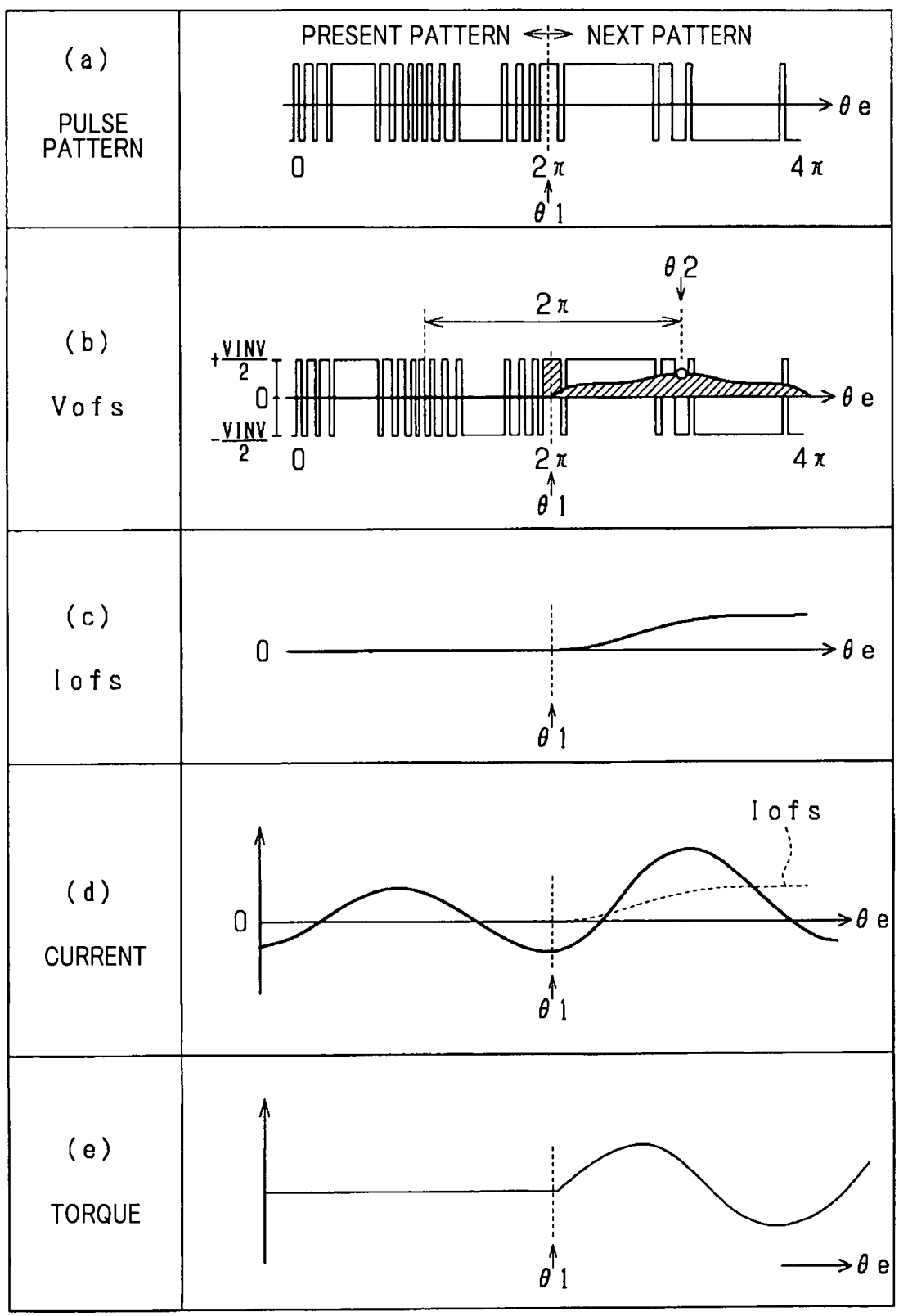
FIG. 5 is a time chart illustrating exemplary waveforms for the case where the current offset remains.

FIG. 5 is an example of how torque fluctuations occur. FIG. 5(a) illustrates the transition from the present to next patterns, and FIG. 5(b) illustrates changes in the voltage offset amount Vofs. FIG. 5(c) illustrates changes in the current offset amount Iofs, FIG. 5(d) illustrates changes in the phase current to the motor generator 10, and FIG. 5(e) illustrates changes in the torque of the motor generator 10.

The voltage offset amount Voft illustrated in FIG. 5(b) is obtained by integrating the pulse pattern over one electrical angle period. In the present embodiment, the logical H signal value of the pulse pattern as an integration target is "+VINV/2", and the logical L signal value thereof is "−VINV/2". FIG. 5(b) illustrates the integration period for calculating the voltage offset amount Vofs at the electrical angle θ2.

The current offset amount Iofs illustrated in FIG. 5(c) is estimated by dividing the integral of the voltage offset amount Vofs in FIG. 5(b) by the inductance of each phase winding wire of the motor generator 10. As illustrated in FIGS. 5(c) and 5(d), the current offset amount is equivalent to the moving average of the phase current in one electrical angle period.

In FIG. 5, the pulse pattern is switched from the present pattern to the next pattern at the electrical angle θ1. After the pulse pattern is switched at the electrical angle θ1, the voltage offset amount Vofs continuously takes positive values as illustrated in FIG. 5(b). This is because the on-operation period is longer than the off-operation period in the integration period. Therefore, the current offset amount Iofs remains greater than zero. As a result, as illustrated in FIG. 5(e), the torque starts to fluctuate at the electrical angle θ1 at an electric angular velocity (electrical angle first order). Note that the torque fluctuations continue until attenuated by a resistance component and an inductance component as loads on the motor generator 10 or until controlled in some way and removed.

Figure 6:
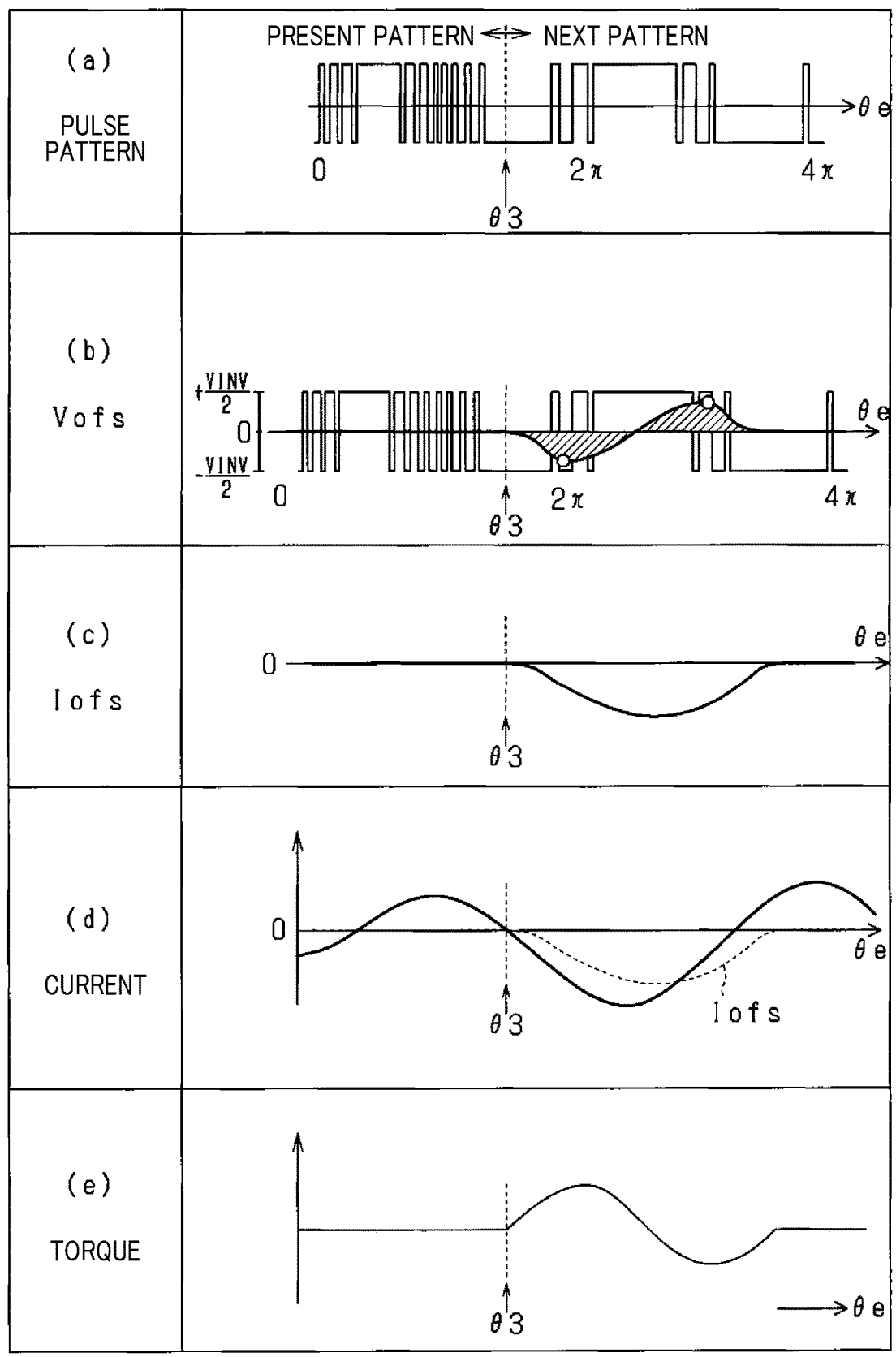
FIG. 6 is a time chart illustrating exemplary waveforms for the case where the current offset is resolved.

FIG. 6 is an example of how torque fluctuations temporarily occur but converge thereafter. Note that FIGS. 6(a) to 6(e) correspond to FIGS. 5(a) to 5(e) above.

In FIG. 6, the pulse pattern is switched from the present pattern to the next pattern at the electrical angle θ3. After the pulse pattern is switched at the electrical angle θ3, the voltage offset amount Vofs illustrated in FIG. 6(b) temporarily takes negative values but crosses zero to take positive values after that. Therefore, the current offset amount Ioft illustrated in FIG. 6(c) temporarily takes negative values but converges to zero within one electrical angle period from the switching. In short, the current offset is resolved. This is because the timing of pulse pattern switching is so appropriate that the negative voltage offset amount Vofs and the positive voltage offset amount Vofs generated after the switching cancel each other out. Consequently, as illustrated in FIG. 6(e), torque fluctuations in the motor generator 10 temporarily occur but are immediately resolved.

Figure 7:
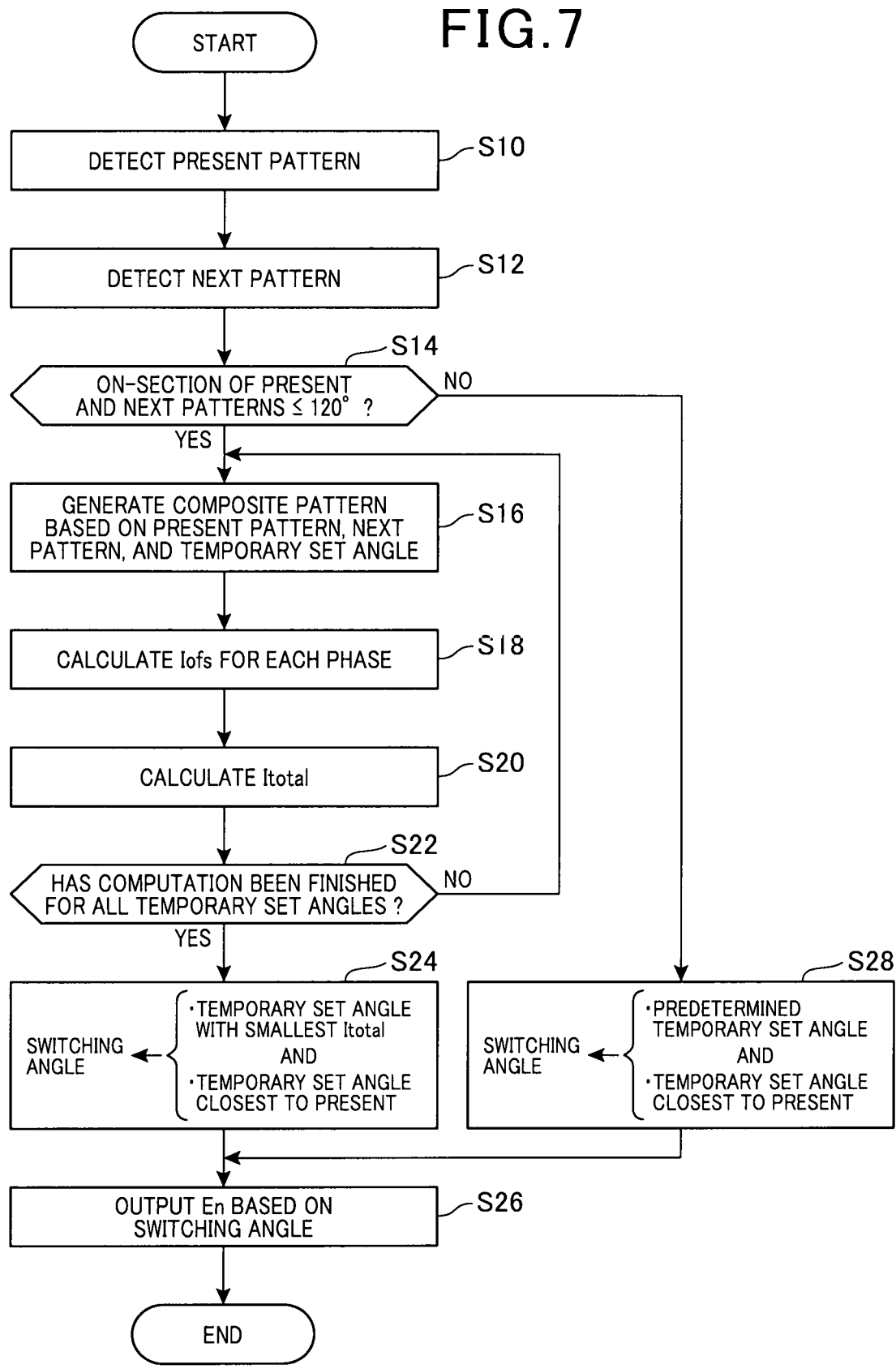
FIG. 7 is a flowchart illustrating a procedure for a switching angle selection process.

A procedure for the switching angle selection process according to the present embodiment is illustrated in FIG. 7. This process is repeatedly executed by the switching determination unit 38k, for example, at stated control periods.

The series of steps begins in step S10 by detecting the present pattern currently output from the pulse pattern selecting unit 38d to the buffer 38f on the basis of the synchronous number N currently output from the synchronous number setting unit 38b to the pulse pattern selecting unit 38d and the modulation factor M currently output from the modulation factor calculating unit 38c to the pulse pattern selecting unit 38d. Here, the synchronous number N held by the first data holding unit 38i is used as the currently output synchronous number N, and the modulation factor M held by the second data holding unit 38j is used as the currently output modulation factor M.

In the subsequent step S12, the next pattern scheduled to be output next time is detected on the basis of the synchronous number N set by the synchronous number setting unit 38b as being scheduled to be output next time and the modulation factor M calculated by the modulation factor calculating unit 38c as being scheduled to be output next time. Note that in the present embodiment, the process of steps S10 and S12 corresponds to a detection unit.

In the subsequent step S14, it is determined whether the logical H period included in each of the present pattern and the next pattern is less than an electrical angle of 120°.

If a "YES" decision is made in step S14, the process proceeds to step S16 where a temporary set angle (corresponding to temporary switching timing) is set, and a composite pattern is generated. The composite pattern is a pulse pattern that is assumed to be switched from the present pattern to the next pattern at the temporary set angle in one electrical angle period. Specifically, the waveform of the composite pattern is obtained by combining the present pattern from −360° to the temporary set angle and the next pattern from the temporary set angle to 360°. Note that the pulse pattern from −360° to 0° means the pulse pattern from 0° to 360° as illustrated in FIG. 4 above.

In step S16, a composite pattern is generated for each of the three phases. Note that composite patterns for the respective phases over one electrical angle period are out of phase with each other by an electrical angle of 120°.

In the subsequent step S18, U, V, and W-phase current offset amounts Iuofs, Ivofs, and Iwofs (corresponding to phase offset amounts) for the respective three phases are generated on the basis of the composite patterns corresponding to the set temporary set angle. More specifically, as illustrated in FIG. 5(b) above, U, V, and W-phase voltage offset amounts Vuofs, Vvofs, and Vwofs are calculated by integrating the composite patterns over one electrical angle period. Then, the integrals of the voltage offset amounts Vuofs, Vvofs, and Vwofs are divided by the inductance L, whereby the current offset amounts Iuofs, Ivofs, and Iwofs are calculated.

Figure 8:
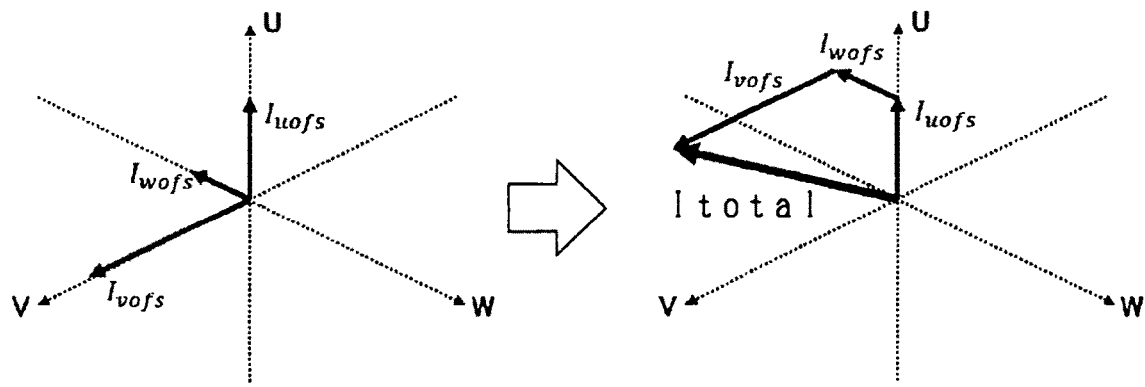
FIG. 8 is a diagram illustrating an exemplary method of combining the current offset amounts for the respective phases.

In the subsequent step S20, a composite offset amount Itotal is calculated by combining the three-phase current offset amounts Iuofs, Ivofs, and Iwofs. FIG. 8 is a diagram illustrating the U, V, and W-phase current offset amounts with vectors Iuofs, Ivofs, and Iwofs. FIG. 8 shows that the absolute value of the vector obtained by combining the vectors Iuofs, Ivofs, and Iwofs is equal to the composite offset amount Itotal.

In the subsequent step S22, it is determined whether the process of steps S16 to S20 has been finished for all the temporary set angles. Specifically, in the preceding step S16, a plurality of different electrical angles in one electrical angle period is set as temporary set angles.

Figure 9:
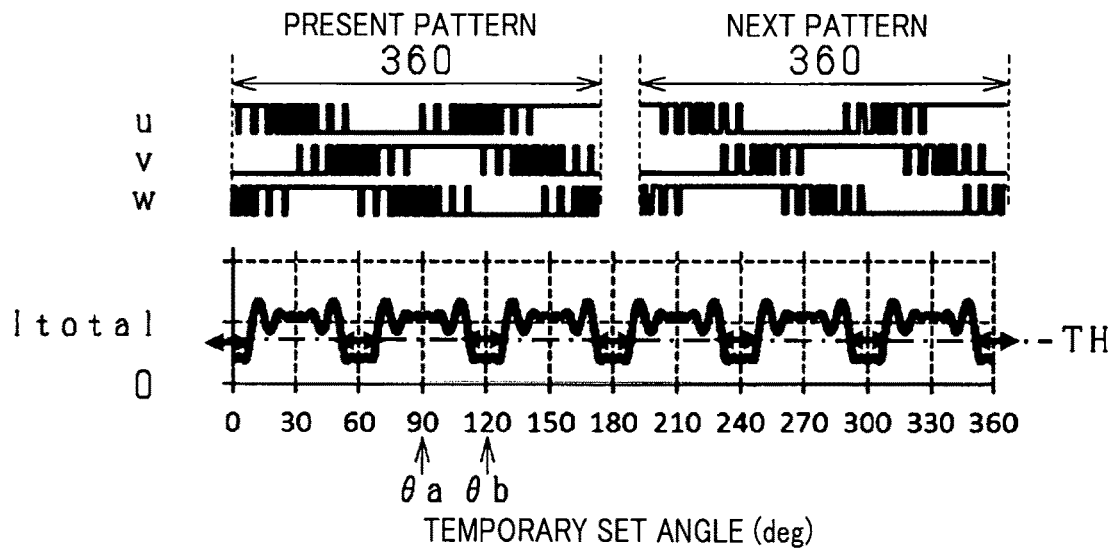
FIG. 9 is a diagram illustrating an exemplary result of computing composite offset amounts corresponding to temporary set angles.

If a "NO" decision is made in step S22, the process returns to step S16 where a new temporary set angle is set. In contrast, if a "YES" decision is made in step S22, the process proceeds to step S24. In step S24, the temporary set angle having the smallest absolute value of the composite offset amount Itotal is selected as a switching angle from among all the temporary set angles. Hereinafter, a method of selecting a switching angle will be described in detail using FIG. 9. FIG. 9 is a diagram illustrating present patterns and next patterns for the three phases used for generating composite patterns and illustrating the result of computing the composite offset amount Itotal corresponding to each temporary set angle.

In the present embodiment, a temporary set angle at which the composite offset amount Itotal is less than a determination value TH is a candidate for the switching angle. In FIG. 9, ranges of temporary set angles that are candidates for the switching angle are indicated by arrows. Here, the determination value TH only needs to be the average of the composite offset amounts Itotal corresponding to the respective temporary set angles, for example.

In the present embodiment, from among temporary set angles at which the composite offset amount Itotal is less than the determination value TH, the temporary set angle subsequent to the present electrical angle θe and closest to the present electrical angle θe is selected as the switching angle. More specifically, for example, assuming that temporary set angles are 30°×N (N is a positive integer) and that the present electrical angle is θa, the electrical angle θb is selected as the switching angle. The above selecting method is employed to prevent a reduction in the torque responsiveness of the motor generator 10. Specifically, if a temporary set angle significantly different from the present electrical angle θe is selected as the switching angle, it takes some time for the actual electrical angle to reach the switching angle at which the pulse pattern is switched to the next pattern. In this case, the torque responsiveness of the motor generator 10 is reduced.

Returning to the description of FIG. 7 above, in the subsequent step S26, a switching permission signal En indicating that the pulse pattern is to be switched from the present pattern to the next pattern at the selected switching angle is output to the buffer 38f. The buffer 38f switches the pulse pattern from the present pattern to the next pattern if it is determined that the addition value θv obtained by adding the electrical angle θe and the command voltage phase δ reaches the input switching angle. Especially in the present embodiment, the buffer 38f switches the pulse patterns from the present patterns to the next patterns simultaneously in the three phases. The purpose of this is to limit the occurrence of torque fluctuations in the motor generator 10.

Specifically, if the pulse patterns in the respective phases are not switched within one electrical angle period, the offset amounts included in the respective phase voltages to the motor generator 10 are theoretically equal to each other. Therefore, the offset amounts included in the interphase voltages to the motor generator 10 cancel each other out. In contrast, it the pulse pattern in one phase is switched in the middle of one electrical angle period, the offset amount included in the phase voltage of the switched phase differs from the offset amounts included in the phase voltages of the other phase voltages. Therefore, the offset amounts included in the interphase voltages between the switched phase and the other phases can no longer cancel each other out. As a result, torque fluctuations occur in the motor generator 10. In order to prevent such a situation, the pulse patterns are switched from the present patterns to the next patterns simultaneously in the three phases.

Figure 10:
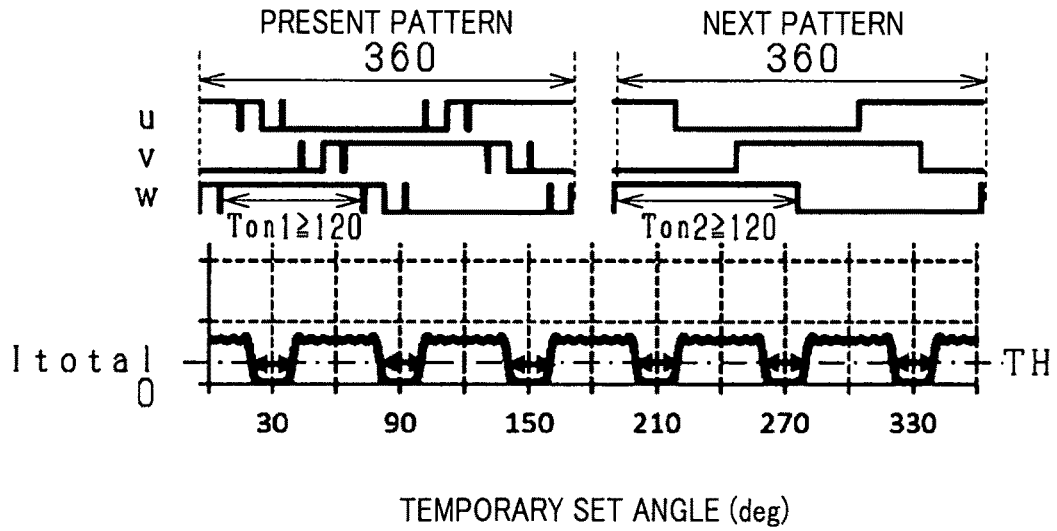
FIG. 10 is a diagram illustrating an exemplary result of computing composite offset amounts corresponding to temporary set angles.

If it is determined in step S14 above that the logical H period included in each of the present pattern and the next pattern is equal to or greater than 120°, the process proceeds to step S28. In step S28, one of a plurality of predetermined temporary set angles is selected as the switching angle. In the present embodiment, as illustrated in FIG. 10, a temporary set angle is set in advance within each of the predetermined electrical angle ranges around 30°+60°×N. The reason why temporary set angles can be set in advance without the above-mentioned process of steps S16 to S24 is that in a case where the on-operation period continues for 120° or more in each of the present pattern and the next pattern, the result of computing the composite offset amount Itotal corresponding to each temporary set angle is obtained as illustrated in FIG. 10.

In the case of a single-phase motor generator, electrical angle ranges with the smallest current offset amount are defined within the ranges around 90° and 270° where logical H continues in the present and next patterns, respectively. Therefore, in a case where the logical H period included in each of the present and next patterns continues for 120° or more in a three-phase motor generator, electrical angle ranges with the smallest composite offset amount Itotal differ from each other by 120°, and are thus defined within the ranges around 30°, 90°, 150°, 210°, 270°, and 330°. Since the electrical angle ranges can be defined in advance in this manner, the process of steps S16 to S24 is unnecessary. Consequently, the computational load on the control device 30 can be reduced. Note that the above-mentioned predetermined electrical angles are stored in a storage unit (in particular, a memory) of the control device 30.

In step S28, from among a plurality of temporary set angles, the temporary set angle subsequent to the present electrical angle θe and closest to the present electrical angle θe is selected as the switching angle. Note that the process proceeds to step S26 after completion of step S28.

According to the present embodiment described in detail above, the following effects can be obtained.

From among a plurality of temporary set angles, the temporary set angle having the smallest absolute value of the composite offset amount Itotal is selected as the switching angle. Therefore, the pulse pattern can be switched from the present pattern to the next pattern at an appropriate timing for reducing the current offset amount, and fluctuations in the output power from the inverter 20 can be limited. Consequently, torque fluctuations in the motor generator 10 can be limited, and the controllability of the motor generator 10 can be improved.

The pulse patterns are switched from the present patterns to the next patterns simultaneously in the three phases. Consequently, torque fluctuations in the motor generator 10 can be limited.

If the logical H period included in each of the present and next patterns is equal to or greater than an electrical angle of 120°, the pulse pattern is switched from the present pattern to the next pattern at a predetermined electrical angle. Consequently, the computational load on the control device 30 can be reduced.

From among temporary set angles with the smallest absolute value of the composite offset amount Itotal, the temporary set angle closest to the present time is selected as the switching angle. Consequently, a reduction in the torque responsiveness of the motor generator 10 can be prevented.

Second Embodiment

Hereinafter, the difference between the first embodiment and the second embodiment will be mainly described with reference to the drawings. The method of selecting a switching angle in the present embodiment differs from that in the first embodiment.

In FIG. 11, a procedure for a switching angle selection process according to the present embodiment is illustrated. This process is repeatedly executed by the switching determination unit 38k, for example, at stated control periods. Note that the steps in FIG. 11 identical to those illustrated in FIG. 7 above are denoted by the same reference signs for convenience.

The series of steps includes selecting a switching angle in step S30 after completion of step S12. In the present embodiment, as illustrated in FIG. 12, a plurality of switching angles is stored as table data in a storage unit of the control device 30 in association with present patterns and next patterns. The table data are information adapted in advance using the method of steps S16 to S24 in FIG. 5 above. The table data have a plurality of candidates for the switching angle in each of the pattern regions defined by the present patterns and the next patterns. This is because the smallest absolute value of the composite offset amount Itotal can be obtained at a plurality of temporary set angles as described in the first embodiment above.

In step S30, first, a pattern region corresponding to detected present and next patterns is selected. Then, from among a plurality of switching angles stored in the selected pattern region, the switching angle subsequent to the present electrical angle θe and closest to the present electrical angle θe is selected. Note that the process proceeds to step S26 after completion of step S30.

According to the present embodiment described above, even when the computational load on the control device 30 is restricted, an appropriate switching angle for limiting torque fluctuations due to pattern switching can be selected.

Note that even if present patterns and next patterns are replaced with each other in the table data illustrated in FIG. 12, switching angles do not change. Therefore, the table data illustrated in FIG. 13 may be prepared so that information in the table data is compressed.

Switching angles for storage in some of the pattern regions defined in the table data where the logical H period included in each of the present and next patterns continues for an electrical angle of 120° or more can be defined within the ranges around 30°, 90°, 150°, 210°, 270°, and 330° as described in the first embodiment above.

Third Embodiment

Hereinafter, the difference between the first embodiment and the third embodiment will be mainly described with reference to the drawings. In the present embodiment, the PWM signals GU, GV, and GW are generated by synchronous PWM control instead of the pulse pattern control.

Figure 14:
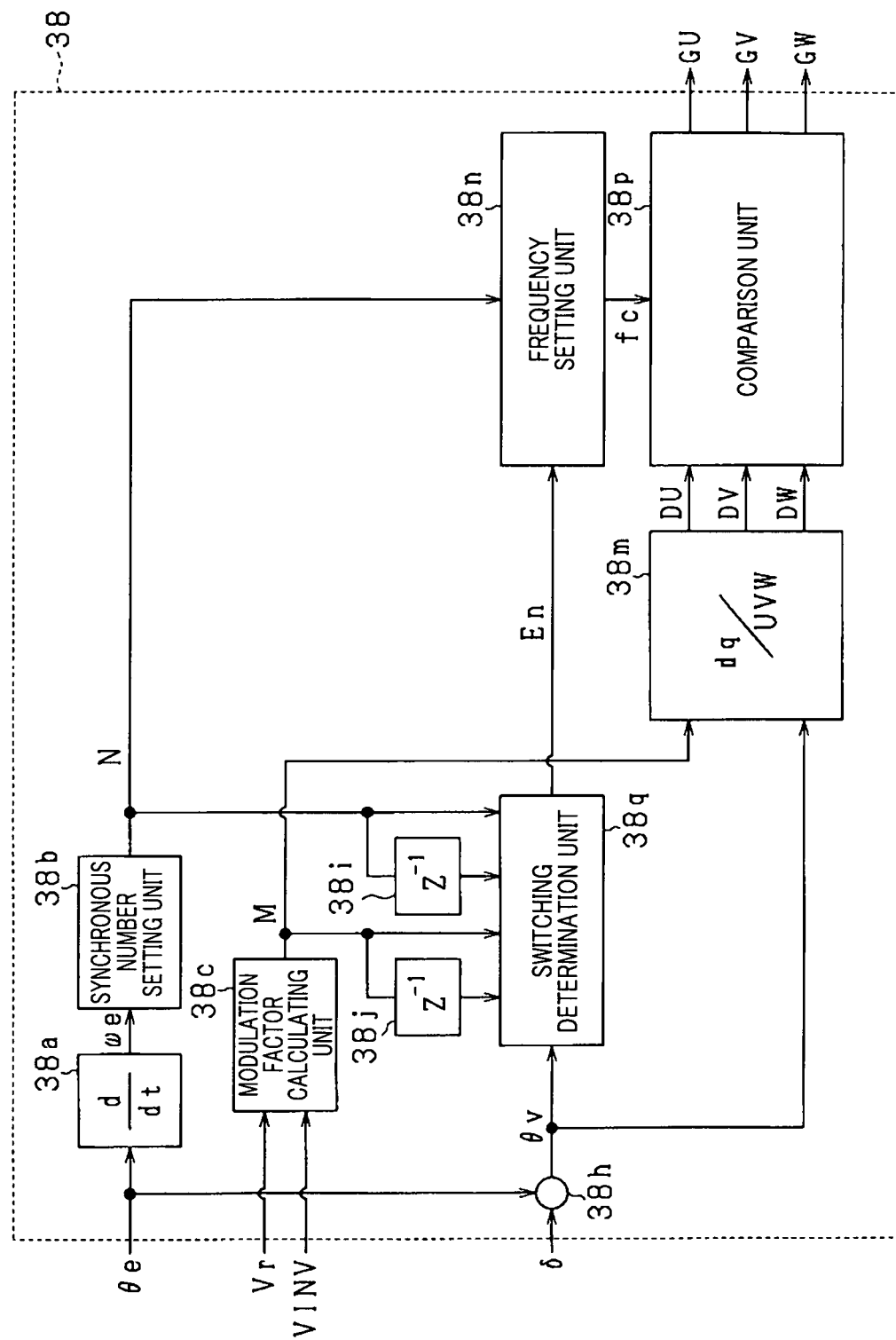
FIG. 14 is a block diagram illustrating a process of a modulator according to a third embodiment.

FIG. 14 is a block diagram illustrating a process of the modulator 38 according to the present embodiment. Note that the components in FIG. 14 identical to those illustrated in FIG. 3 above are denoted by the same reference signs for convenience.

A command value setting unit 38m calculates sine-wave U, V, and W-phase command time ratios DU, DV, and DW on the basis of the modulation factor M and the addition value Env output from the addition unit 38h. The waveforms of the U, V, and W-phase command time ratios DU, DV, and DW are out of phase with each other by an electrical angle of 120°.

A frequency setting unit 38n sets a carrier frequency fc on the basis of the synchronous number N such that the command time ratios DU, DV, and DW and a carrier are synchronized with each other. More specifically, the frequency setting unit 38n sets the carrier frequency fc such that the carrier period is equal to the value obtained by dividing one electrical angle period by the synchronous number N.

A comparison unit 38p generates the PWM signals GU, GV, and GW through a PWM process that is based on magnitude comparison between the U, V, and W-phase command time ratios DU, DV, and DW output from the command value setting unit 38m and a carrier having the carrier frequency fc set by the frequency setting unit 38n. A carrier according to the present embodiment is a triangular wave signal that is based on a dual slope modulation scheme, and in particular an isosceles triangular signal with equal increase and decrease rates. The increase rate and decrease rate are quantified, for example, by an increase and decrease in carrier per unit change in electrical angle. A carrier according to the present embodiment is a signal with a minimum value of zero and a maximum value of one.

Next, a switching determination unit 38q will be described.

The switching determination unit 38q detects the present pattern on the basis of the synchronous number N currently output from the synchronous number setting unit 38b to the frequency setting unit 38n and the modulation factor M currently output from the modulation factor calculating unit 38c to the command value setting unit 38m. The switching determination unit 38q also detects the next pattern on the basis of the synchronous number N set by the synchronous number setting unit 38b as being scheduled to be output next time and the modulation factor M calculated by the modulation factor calculating unit 38c as being scheduled to be output next time.

The switching determination unit 38q selects a switching angle using the process of steps S16 to S24 illustrated in FIG. 7 above. If the switching determination unit 38q determines that the addition value θv output from the addition unit 38h reaches the selected switching angle, it outputs, to the frequency setting unit 38n, a switching permission signal En indicating that the carrier frequency fc is to be switched to a value corresponding to the next synchronous number N.

According to the present embodiment described above, effects similar to those of the first embodiment can be obtained.

Fourth Embodiment

Figure 15:
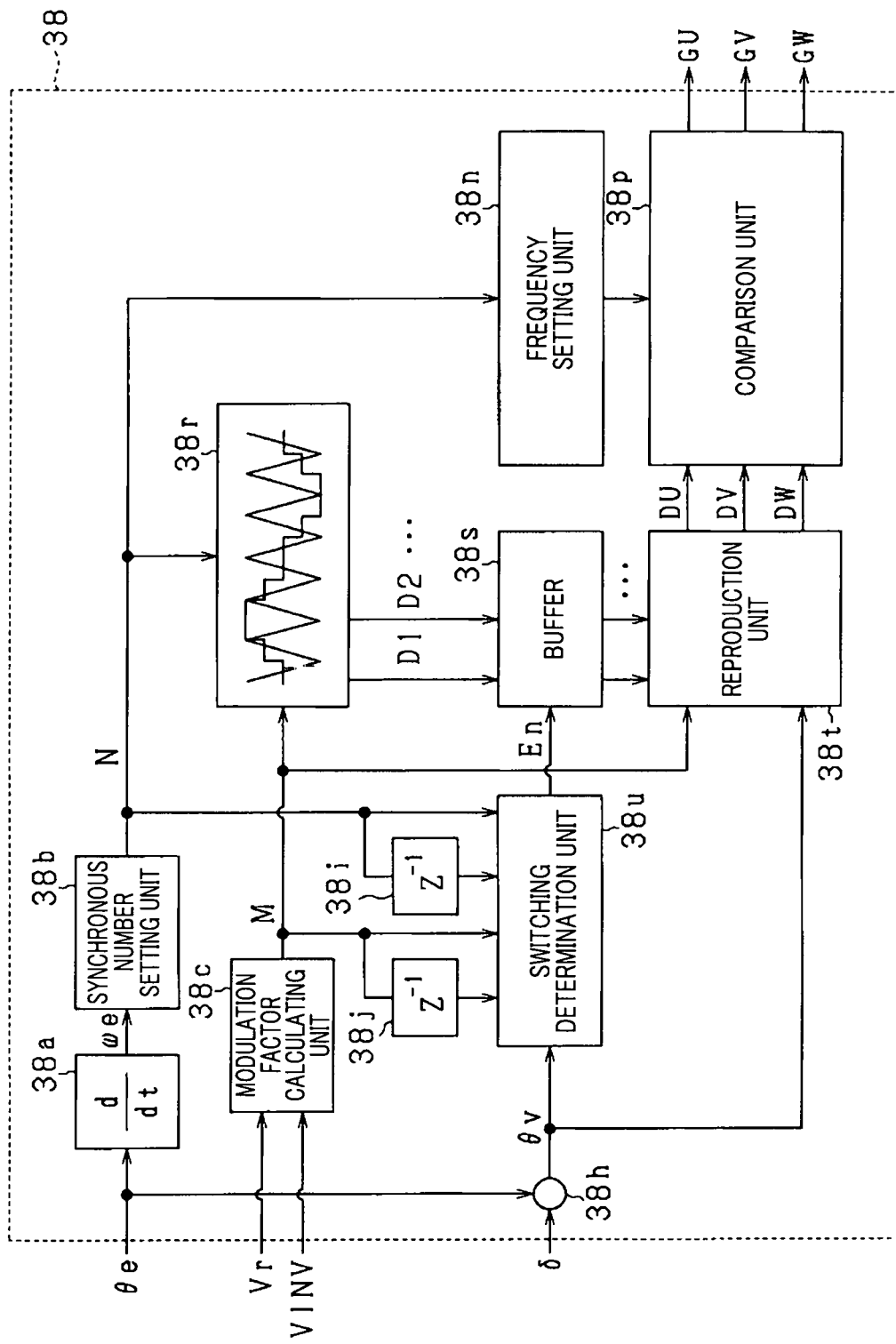
FIG. 15 is a block diagram illustrating a process of a modulator according to a fourth embodiment.

Hereinafter, the difference between the third embodiment and the fourth embodiment will be mainly described with reference to the drawings. The process of the modulator 38 in the present embodiment differs from that in the third embodiment. FIG. 15 is a block diagram illustrating the process of the modulator 38 according to the present embodiment. Note that the components in FIG. 15 identical to those illustrated in FIG. 14 above are denoted by the same reference signs for convenience.

A time ratio pattern selecting unit 38r selects a time ratio pattern, i.e., a command time ratio over one electrical angle period, on the basis of the synchronous number N output from the synchronous number setting unit 38b and the modulation factor M output from the modulation factor calculating unit 38c. In the present embodiment, a time ratio pattern corresponds to an operation pattern. Time ratio patterns are stored in advance in a storage unit of the control device 30 in association with synchronous numbers N and modulation factors M. A time ratio pattern is generated using the idea of synchronous triangular wave comparison PWM control. In other words, a time ratio pattern is a pattern that can change every carrier half period The time ratio pattern selecting unit 38r selects one appropriate time ratio pattern on the basis of the synchronous number N and the modulation factor M. The time ratio pattern selecting unit 38r outputs, to a buffer 38s, values of the selected time ratio pattern corresponding to the respective carrier half periods.

The values input to the buffer 38s are input to a reproduction unit 38t thereafter. The reproduction unit 38t selects a value corresponding to the addition value θv output from the addition unit 38h from among the input values of the selected time ratio pattern. The reproduction unit 38t generates the U, V, and W-phase command time ratios DU, DV, and DW on the basis of the selected value, and outputs them to the comparison unit 38p.

Note that a switching determination unit 38u selects a switching angle in the same manner as illustrated in FIG. 7 in the first embodiment. Here, a currently output time ratio pattern corresponds to the present pattern, and a time ratio pattern scheduled to be output next time corresponds to the next pattern. The switching determination unit 38u outputs, to the buffer 38s, a switching permission signal En indicating that the pulse pattern is to be switched from the present pattern to the next pattern at the selected switching angle. The buffer 38s switches the pulse pattern from the present pattern to the next pattern if it is determined that the addition value θv output from the addition unit 38h reaches the input switching angle.

According to the present embodiment described above, effects similar to those of the third embodiment can be obtained.

Other Embodiments

Note that the above-mentioned embodiments may be changed and implemented in the following manner.

In the above-mentioned first embodiment, the voltage offset amount Vofs may be calculated on the assumption that the logical H signal value of the pulse pattern as an integration target is "100%" and that the logical L signal value thereof is "0%".

In the above-mentioned embodiments, from among a plurality of timings that serves as candidates for the timing of switching from the present pattern to the next pattern, the timing having the smallest absolute value of the output current offset amount is selected. However, the present disclosure is not limited to this example. From among the plurality of timings, a timing other than the timing having the smallest offset amount and the timing having the largest offset amount may be selected. The output current offset amount can also be reduced in this case, as compared with a case where the timing having the largest offset amount is selected.

In FIG. 7 of the above-mentioned first embodiment, the process of steps S14 and S28 may be omitted.

In the above-mentioned first embodiment, the current offset amount is obtained by dividing the integral of the voltage offset amount by the inductance value. However, the division may be omitted. In a case where a switching angle is selected based on relative comparison between the current offset amounts in the respective temporary set angles, the same result can be obtained by comparison between the integrals of voltage offset amounts as long as the inductance value is a constant.

Instead of the three-phase inverter, an inverter having a single phase, two phases, or four or more phases may be used.

A motor generator that is a load electrically connected to an inverter may be, for example, a wound-field motor generator instead of a permanent magnet embedded motor generator. A motor generator may be, for example, an induction machine instead of a synchronous machine. Further, the load is not limited to a rotating electrical machine.

The present disclosure has been described with reference to examples, but it is to be understood that the present disclosure is not limited to the examples and structures. The present disclosure covers various modifications and equivalent variations. In addition to various combinations and forms, other combinations and forms including one or more/less elements thereof are also within the spirit and scope of the present disclosure.

The invention claimed is:

1. An inverter control device that is applied to an inverter including series connections for each of an upper arm switch and a lower arm switch, the inverter control device being configured to alternately turn on the upper arm switch and the lower arm switch on the basis of an operation pattern that is a time-series pattern that defines a switching pattern for each of the upper arm switch and the lower arm switch, the inverter control device comprising:
   a detection unit that detects each of a present pattern that is the operation pattern currently set and a next pattern that is the operation pattern to be set next time;
   a timing selecting unit that selects a command switching timing from among a plurality of timings set in the middle of the present pattern over one electrical angle period, the plurality of timings being candidates of switching from the present pattern to the next pattern; and
   a switching unit that switches the operation pattern from the present pattern to the next pattern at the command switching timing selected by the timing selecting unit, wherein:
   the present pattern has a predetermined first number of pulses, at least one of the predetermined first number of pulses having a first pulse width,
   the next pattern has a predetermined second number of pulses, at least one of the predetermined second number of pulses having a second pulse width,
   a sum of the present pattern and the next pattern corresponds to the one electrical angle period,
   the at least one of the first number of pulses and the first pulse width are different from the corresponding at least one of the second number of pulses and the second pulse width,
   the timing selecting unit includes:

a pattern generating unit that generates a composite pattern that is the operation pattern obtained by combining the present pattern and the next pattern in a case where each of a plurality of temporary switching timings in the middle of one electrical angle period is temporarily set as one of the plurality of timings that is the candidates of switching; and a current offset calculating unit that calculates a current offset amount included in an output current from the inverter based on the assumption that each of the arm switches is operated on the basis of the generated composite pattern in a case where each of the plurality of temporary switching timings is temporarily set, and the timing selecting unit selects, as the command switching timing from among the plurality of temporary switching timings, a timing corresponding to a current offset amount other than the largest current offset amount of all the current offset amounts corresponding to the plurality of temporary switching timings.

2. The inverter control device according to claim 1, wherein the inverter is a multi-phase inverter electrically connected to a multi-phase rotating electrical machine and configured to supply AC power to the multi-phase rotating electrical machine, the pattern generating unit generates the composite pattern for each phase, and the current offset calculating unit calculates, for each phase, a phase offset amount included in the output current from the inverter based on the assumption that each of the arm switches is operated on the basis of the generated composite pattern, and calculates the current offset amount by combining the phase offset amounts calculated for the respective phases.

3. The inverter control device according to claim 2, wherein the switching unit switches the operation patterns from the present patterns to the next patterns simultaneously in the respective phases.

4. The inverter control device according to claim 2, wherein the multi-phase rotating electrical machine is a three-phase rotating electrical machine, the inverter is a three-phase inverter, and in a case where an on-operation command period continues for 120° or more in each of the present pattern and the next pattern, the timing selecting unit selects, as the command switching timing, a timing set in advance within a predetermined electrical angle range around a value obtained by adding 30° to a value obtained by multiplying 60° by a positive integer.

5. The inverter control device according to claim 1, wherein the timing selecting unit selects, as the command switching timing from among the plurality of temporary switching timings, a timing corresponding to a current offset amount other than the largest current offset amount of all the current offset amounts corresponding to the plurality of temporary switching timings, the timing being closest to a present time.

6. The inverter control device according to claim 1, wherein the timing selecting unit selects, as the command switching timing from among the plurality of temporary switching timings, a timing corresponding to the smallest current offset amount of all the current offset amounts corresponding to the plurality of temporary switching timings.

7. The inverter control device according to claim 1, wherein the operation pattern is a binary signal time-series pattern, and the current offset calculating unit calculates an average of the generated composite pattern in one electrical angle period, and calculates the current offset amount on the basis of an integral of the calculated average.

8. The inverter control device according to claim 1, comprising a timing storage unit that stores the plurality of timings that are candidates of switching from the present pattern to the next pattern, wherein the timing selecting unit selects the command switching timing from among the plurality of timings stored in the timing storage unit.

9. The inverter control device according to claim 8, wherein the timing selecting unit selects a timing closest to a present time as the command switching timing from among the plurality of timings stored in the timing storage unit.

* * * * *